United States Patent [19]

McKelvey et al.

[11] 4,173,445
[45] Nov. 6, 1979

[54] PLASTICS EXTRUSION APPARATUS

[75] Inventors: James M. McKelvey, St. Louis, Mo.; Samuel Steingiser, Bloomfield, Conn.

[73] Assignee: Monsanto Company, St. Louis, Mo.

[21] Appl. No.: 925,375

[22] Filed: Jul. 17, 1978

[51] Int. Cl.² .............................................. B29F 3/06
[52] U.S. Cl. .......................... 425/376 A; 264/176 R; 264/349; 425/378 R; 425/380
[58] Field of Search ............... 425/376 R, 378 R, 380; 264/176 R, 349

[56] References Cited

U.S. PATENT DOCUMENTS

| | | |
|---|---|---|
| 3,023,456 | 3/1962 | Palfrey . |
| 3,263,276 | 8/1966 | Maier . |
| 3,456,298 | 7/1969 | Foster et al. ........................ 425/378 |
| 3,866,890 | 2/1975 | Tadmor et al. ...................... 264/349 |
| 3,949,973 | 4/1976 | Bishop et al. ....................... 264/349 |
| 4,006,209 | 2/1977 | Chiselko et al. .................... 264/349 |
| 4,107,260 | 8/1978 | Dougherty ......................... 264/349 |

OTHER PUBLICATIONS

Techn. Papers Soc. of Plastic Engineers Annual Techn. Conf. May 1974, pp. 462–465.
Plastic Engineering, Improved Processing with Meter Starved Feeding of Extruders, Jun. 1978, pp. 45–49.

Primary Examiner—William E. Schulz
Attorney, Agent, or Firm—Michael J. Murphy

[57] ABSTRACT

In plastics extrusion apparatus including a rotating screw in a cylinder forming a channel receiving solid material and eventually expressing it through a die, the channel comprising a feed zone, a melting and compression zone and a melt pumping zone, the improvement wherein a solids decompression zone is between the feed and the melting and compression zones which has increased unit volume relative to that of the feed zone, with the channel of the melting and compression zone communicating with the feed inlet through the decompression and feed zones such that solids are initially metered producing a starved condition so as to melt at substantially atmospheric pressure without filling the channel of the melting and compression zone until close to its end.

10 Claims, 4 Drawing Figures

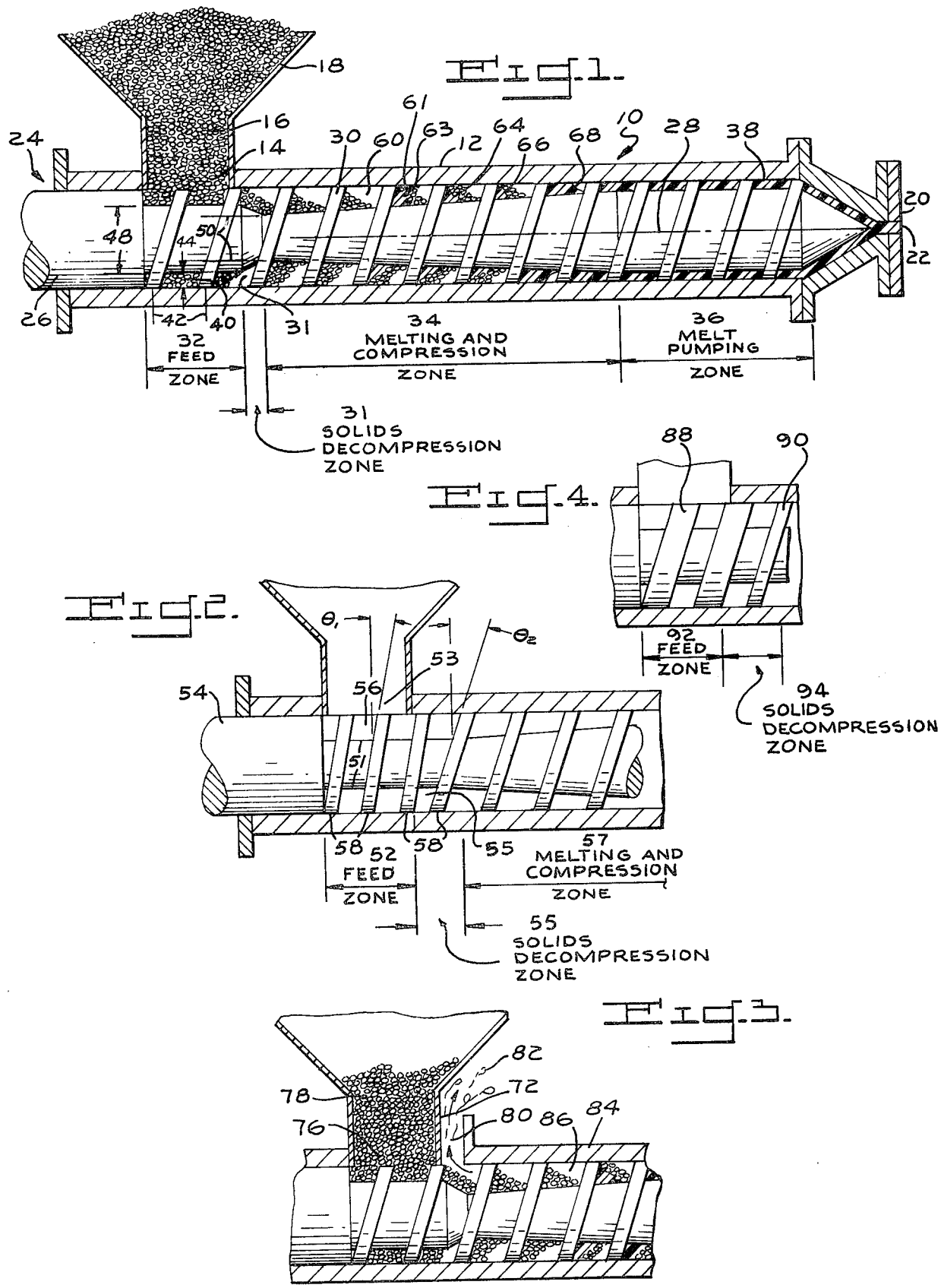

PLASTICS EXTRUSION APPARATUS

BACKGROUND OF THE INVENTION

This invention relates to extrusion apparatus for melting solid plastic and generating hydrostatic pressure to force the melt through a die, and more particularly to an improved screw for use in such apparatus.

Continuously operating screw extruders for processing synthetic resinous plastic material are conventionally gravity fed from a source of stock in solid or particulate form to a screw portion beneath the feed inlet having the same or greater conveying capacity as that beyond the inlet. Systems under such conditions are said to operate in a flood feed mode, and traditionally exhibit a certain level of mass flow surging in the outlet die particularly at high throughput rates which results in corresponding undesirable fluctuations in extrudate weight. Such surging as manifested by fluctuating melt pressure in the delivery tube to the die is believed caused by a fluctuation in the axial position of the solid-melt interface along the screw. More specifically, when such interface moves rearwardly toward the feed end of the system, pressure and therefore mass flow through the die is increased whereas forward movement decreases pressure and mass flow. This fluctuation of the interface is a function of a number of variables such as, for example, extruder barrel temperature profile, head of material in the hopper feeding the extruder, temperature and bulk density of the feed stock, level of buildup of volatile products within the extruder and the like. Likewise characteristic of systems operating under flood feed conditions at high throughput rates are reduced power economy (mass extrusion rate divided by mechanical power) and increased occlusion of air which, if present, results in bubbles in the extrudate.

SUMMARY OF THE INVENTION

Now, however, improvements have been developed in plastics extrusion apparatus which reduce or substantially overcome the aforementioned prior art shortcomings.

Accordingly, it is a principal object of this invention to provide an improved screw member of novel construction for use in extrusion apparatus which is capable of self-regulating a feed of particulate material from the extruder inlet to the downstream zone of the extruder.

Another object is to provide such a screw member which permits operation of the extruder hopper in the flood feed mode while achieving the metered-starved state with respect to the screw without the use of apparatus external to the extruder.

Another object is to provide a self-starving screw member for use in a plastics extruder which substantially reduces torque and mechanical power requirements, improves volatiles venting and provides a high degree of uniformity of mass flow and pressure at the die.

Other objects of this invention will in part be obvious and will in part appear from the following description and claims.

These and other objects are accomplished in plastics extrusion apparatus which includes a hollow cylinder having an inlet for containing a bed of solid plastic, a rotatable screw within the cylinder defining with the cylinder a helical channel for the plastic comprising in series, a feed zone beneath the inlet and a melting zone, by providing the improvement which comprises a solids decompression zone between the feed zone and the melting zone having increased free volume relative to the feed zone whereby before significant melting occurs the bed of solid plastic is decompressed to the extent that the channel in the solids decompression zone is partially filled.

BRIEF DESCRIPTION OF THE DRAWING

In describing the overall invention, reference will be made to the accompanying drawing wherein:

FIG. 1 is a longitudinal, sectional view in schematic form of a screw extruder apparatus embodying the invention;

FIGS. 2 and 4 are partial, schematic views of alternate forms of apparatus embodying the invention; and FIG. 3 is a partial, schematic view similar to FIG. 1 illustrating a feature of the invention.

DETAILED DESCRIPTION OF ILLUSTRATED EMBODIMENTS

Referring now to the drawing, a plastic extrusion apparatus in FIG. 1 is collectively identified as 10 and includes horizontally elongated, hollow cylinder 12 formed with feed inlet 14 preferably adjacent its rearward end for receiving plastic material 16 from a reservoir in the form of feed hopper 18. Except for inlet 14, cylinder 12 is preferably otherwise without vent ports along its length. Die 20 at the opposite, forward end of cylinder 12 is formed with through-opening 22 which may be of any cross sectional configuration, such as cylindrical, tubular, substantially rectangular or the like through which the plastics material in melt form exits the system. Melt issuing from opening 22 may be either in finished form or a semi-finished product where further shaping is contemplated before it assumes its finished condition. Though not shown, an annular chamber surrounding cylinder 12 may be conventionally formed by providing a jacket around cylinder 12 for circulation of a suitable heat transfer medium such as steam or water to either add to or remove heat from the plastics material being processed. Electric heaters in heat transfer contact with the outer surface of cylinder 12 are also suitable for this purpose.

Screw 24 within cylinder 12 is fixed against axial movement along cylinder 12 and mounted for rotation about its longitudinal axis 28 via suitable motor means, bearings and similar rotary motion transmitting components, not shown, conventionally associated with rearward end 26. Screw 24 has a longitudinal shaft of varying diameters with helical thread 30 formed thereon which on rotation of the shaft moves in close proximity to and with minimal clearance from the inner surface of the bore of cylinder 12.

The helical thread 30 of screw 24 in combination with the smooth inner wall delimiting the bore of cylinder 12 defines an unobstructed, forwardly directed helical channel between inlet 14 and die 22 through which material 16 passes in being converted to melt form. Such helical channel comprises, in series, feed zone 32 beneath and receiving solid particulate material 16 through feed inlet 14, melting or melting and compression zone 34 progressively melting material 16 received from zone 32, and melt pumping zone 36 pumping melted material 38 under pressure through die opening 22. In the representative embodiment of FIG. 1 the diameter of the shaft portion of screw 24 in zone 34 progressively increases to a maximum at the inlet end of zone 36 along which such shaft diameter is constant. The configuration of screw 24 in zones 34 and 36 may, however, vary from that shown and the apparatus may include more than one of each of such zones to accomplish melting and pumping.

In accordance with the invention, a special decompression section or zone 31 (FIG. 1) is incorporated into the screw to decompress the solid bed of plastic 16 contained within inlet 14 to the extent that the channel in such decompression zone is only partially filled in the region forward of feed hopper 18 and feed zone 32 and before melting has made little if any significant progress. Such decompression is accomplished by increasing the free or open volume of the helical channel in such decompression zone, for example, by varying the geometric parameters defining the shape of screw 24 according to any of a number of ways to be now described.

In the embodiment of FIG. 1 decompression is accomplished by decreasing the root or shaft diameter of screw 24 in zone 31 relative to that in feed zone 32 while holding all other parameters constant. More specifically, feed zone 32 includes annular channel section 40 disposed across feed inlet 14 having reduced unit volume relative to that of solids decompression zone 31 immediately downstream of such channel section 40. Such reduced unit volume of channel 40 is calculable as the product of pitch length 42 in zone 32 minus the width of the screw flight or thread therein times the annular cross-sectional area 44 of such channel 40. Diameter 48 of screw shaft 26 of reduced unit volume section 40 is greater than that in zone 31 which in FIG. 1 extends forwardly to where compression commences via an increase at 50 in the diameter of shaft 26. Pitch 42 in FIG. 1 of thread 30 is substantially constant throughout feed zone 32 and preferably is constant along the full length of screw 24, as shown.

In the embodiment of FIG. 2, decompression is accomplished by increasing the helix angle of the thread of the screw in the solids decompression zone relative to that in the feed zone, holding all other parameters constant. More specifically, the feed metering process to be further explained hereafter will be the same as achieved with that of FIG. 1 in that though shaft diameter 51 is less than at 48 in FIG. 1, helix angle $\theta_1$ in feed zone 52 beneath feed inlet 53 is different from and less than $\theta_2$ in solids decompression zone 55. Stated reversely $\theta_2$ in zone 55 is greater than $\theta_1$ in zone 52. Channel section 56 disposed across feed inlet 53 thus has reduced unit volume defined as the product of the annular cross-sectional area of channel 56 times pitch length 58 minus the flight thickness, such channel of reduced volume being substantially constant in feed zone 52.

With respect to the embodiment of FIG. 4, the reduced unit volume of the channel in feed zone 92, or conversely the increased unit volume in solids decompression zone 94 relative to feed zone 92, is achieved by increasing the lateral thickness of screw flight 88 in zone 92 relative to the reduced thickness shown at 90 in zone 94.

In operation, extrudable, solid, resinous thermoplastic material, preferably in particulate form, is continuously flood fed by gravity through inlet 14 to feed zone 32 of apparatus 10 and advanced via helical thread 30 (FIG. 1) along solids decompression zone 31, melting and compression zone 34 and melt pumping zone 36 until eventually forced in melt form through die opening 22. As shown in FIG. 1, the solid plastic bed present in feed zone 32 is decompressed or expanded in zone 31 in that zone 31 has a larger unit volume than that in the immediately preceding zone 32 with the result that the channel in zone 31 is only partially filled with plastic. In zone 34, the solids impinge on the inside surface of cylinder 12 forming a melt film 61 which collects in a melt pool at the rearward end of the channel between adjacent flight sections so that there exists simultaneously in each such channel section a pool of melted plastic, a solids portion and an open channel which extends throughout substantially the entire melting and compression zone 34.

With respect to melt pumping zone 36, the pressure generated therein is dependent on the speed of rotation of screw 24, the viscosity of the melted plastic and the annular cross section and length of such zone.

In order to achieve the greatest reduction in pressure and mass flow variations at the die, it is preferred that the screw be designed for a given set of extruder operating conditions so that the depth of the channel at the point where the channel first becomes completely filled with melt is somewhat greater, for example twice as deep, as in the melt pumping section of the screw.

Channel section 40 in FIG. 1 and 56 in FIG. 2 in feed zones 32 and 52 respectively, and the similarly limited section in feed zone 92 of FIG. 4, all have reduced channel volume relative to that in the immediately adjacent solids decompression zones, and thus meter the particulate material into the melting and compression zones 34, 57, and 94 at a rate less than that at which it is capable of being conveyed away so as to produce a starved condition during compression and progressive melting in zones 34, 57, and the corresponding one in FIG. 4, not shown. As depicted in FIG. 1, channel 60 in melting and compression zone 34 is not completely filled until, as shown at 68, a point substantially at the end of zone 34. As mentioned, the channel in zone 34 rearwardly, of region 68 toward inlet 14 between adjacent thread sections comprises an open portion for venting, in addition to a portion containing solid material and a portion containing molten polymer. Under such conditions, the helical channel up to point 68 where it is substantially completely filled with melted plastic and through which the material has just progressed forwardly, will be vented back through feed zone 32, 52 (FIG. 2) and 92 (FIG. 4) to the feed inlet. Stated differently, the unfilled portion of channel 60 in zone 34 substantially spirally intercommunicates rearwardly back through the solids decompression and feed zones with the inlet. The vent path for air occluded in the particulate material or any gases emitted from the material working their way around back through the unfilled portion of the helical channel maintains the system up through substantially the end of the melting and compression zone at substantially atmospheric pressure, such path being in the opposite direction to the forwardly advancing material and constituting a portion of the channel also occupied by solid and melted material. The material being gradually converted to molten form is depicted by the increasing depth of melt pool at 63, 64, 66 and 68 in FIG. 1. Assuming sufficient gases being backwardly vented and percolating up through the solid bed in feed hopper 18, a nominal pressure slightly above atmospheric pressure can exist in zone 34. Such melting at essentially atmospheric pressure in a partially filled channel translates into reduced torque requirements to turn screw 24 which in turn can reduce motor and gear box sizes by from about 30 to 50% vis-a-vis conventional flood feed systems where melting occurs in a filled channel and high hydrostatic pressures are generated concurrently with the melting of the polymer. Such reductions in systems according to the invention in turn permit realization of significantly lower extrudate temperatures.

In the embodiment of FIG. 3, baffle 72 is disposed in inlet 76 to confine material 78 being fed to the system through inlet 76 to the upstream side of such baffle 72. This creates a slot 80 in the solids decompression zone allowing gases 82 venting from cylinder 84 to escape to atmosphere and thus maintain atmospheric pressure during compression along channel portion 86. Such a feature avoids any venting gases having to percolate up through the feed hopper, otherwise the system is identical to and operates the same as those of FIGS. 1, 2 and 4.

Though the ratios of unit volume of the channel in the section of the feed zone disposed across the feed inlet to that of the unit volume of the channel in the solids decompression zone immediately beyond such inlet may vary depending upon the extent of metered-starved feed mode desired to be accomplished with the self-starving screw configurations of the invention, it is preferred that such ratio be maintained between about 0.95 to about 0.5.

The present invention may be applied to any type of extruder screw and is not limited to the single flight, single stage metering screw shown in the drawing. Also, as opposed to relying on only one of the approaches described herein to achieve decompression, various combinations of the techniques disclosed in FIGS. 1, 2 and 4 for specifying the shape of the screw to achieve the metered-starved state can be used. For example, screw shaft diameter, flight angle and flight width may each be cooperatively specified to provide the particular degree of solids decompression desired for the system being designed.

The above description and particularly the drawing is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:
1. In plastics extrusion apparatus which includes:
a hollow cylinder having an inlet for containing a bed of solid plastic;
a rotatable screw within said cylinder defining with said cylinder a helical channel for the plastic comprising in series, a feed zone beneath the inlet and a melting zone;
the improvement which comprises:
a solids decompression zone between the feed zone and the melting zone having increased free volume relative to the feed zone;
whereby before significant melting occurs the bed of solid plastic is decompressed to the extent that the channel in the solids decompression zone is partially filled.

2. The apparatus of claim 1 wherein the solids decompression zone is just forward of the feed zone in the direction of plastics extrusion.

3. The apparatus of claim 1 wherein the screw has a reduced shaft diameter in the solids decompression zone relative to that in the feed zone.

4. The apparatus of claim 2 wherein the screw thread has a helix angle in the solids decompression zone which is greater than that in the feed zone.

5. The apparatus of claim 1 wherein the screw thread has a thickness in the solids decompression zone which is less than that in the feed zone.

6. In plastics extrusion apparatus which includes:
an elongated hollow cylinder having an inlet receiving plastic material in particulate form from a reservoir and a die through which material exits the cylinder;
a rotatable screw within said cylinder having a longitudinal shaft with a helical thread thereon;
a helical channel between the inlet and the die defined by said screw and cylinder through which material passes, said channel comprising in series, a feed zone receiving particulate material from the inlet, a melting and compression zone melting material from the feed zone and a melt pumping zone pumping melted material through the die;
the improvement in said apparatus wherein:
(i) the feed zone includes a channel section disposed across the inlet having reduced unit volume relative to that of a decompression zone immediately downstream of said channel section; and
(ii) the channel in the melting and compression zone communicates through the decompression and feed zones with the inlet;
whereby said channel section meters particulate material to produce a starved condition in the melting and compression zone such that melting is at substantially atmospheric pressure without filling the channel in the melting and compression zone until substantially the end thereof.

7. The apparatus of claim 6 wherein the shaft of the screw in the section of the feed zone with reduced unit volume has a greater diameter than that in the decompression zone.

8. The apparatus of claim 6 wherein the thread in the section of the feed zone with reduced unit volume has a helix angle which is less than that of the thread in the decompression zone.

9. The apparatus of claim 6 wherein the screw flight has a thickness in the feed zone which is greater than that in the decompression zone.

10. The apparatus of claims 6, 7, 8 or 9 wherein the channel in the section of the feed zone with reduced volume has a cross section which is substantially constant.

* * * * *